(12) United States Patent
Reichert et al.

(10) Patent No.: US 9,803,529 B2
(45) Date of Patent: Oct. 31, 2017

(54) COMPACT CYLINDRICAL SELECTIVE CATALYTIC REDUCTION SYSTEM FOR NITROGEN OXIDE REDUCTION IN THE OXYGEN-RICH EXHAUST OF 500 TO 4500 KW INTERNAL COMBUSTION ENGINES

(71) Applicant: JOHNSON MATTHEY CATALYSTS (GERMANY) GMBH, Redwitz (DE)

(72) Inventors: Dirk Reichert, Karlsruhe (DE); Ilir Piluri, Bayreuth (DE)

(73) Assignee: Johnson Matthey Catalysts (Germany) GMBH, Redwitz (DE)

( * ) Notice: Subject to any disclaimer, the term of this patent is extended or adjusted under 35 U.S.C. 154(b) by 37 days.

(21) Appl. No.: 14/643,080

(22) Filed: Mar. 10, 2015

(65) Prior Publication Data

US 2015/0260070 A1    Sep. 17, 2015

Related U.S. Application Data

(60) Provisional application No. 61/951,211, filed on Mar. 11, 2014, provisional application No. 61/973,329, filed on Apr. 1, 2014.

(51) Int. Cl.
*B01D 50/00* (2006.01)
*F01N 3/20* (2006.01)
*F01N 13/00* (2010.01)

(52) U.S. Cl.
CPC ....... *F01N 3/2066* (2013.01); *F01N 13/0097* (2014.06); *F01N 13/017* (2014.06); *F01N 2240/20* (2013.01); *F01N 2260/08* (2013.01); *F01N 2340/00* (2013.01); *F01N 2490/06* (2013.01); *F01N 2590/02* (2013.01); *F01N 2590/08* (2013.01); *F01N 2590/10* (2013.01);
(Continued)

(58) Field of Classification Search
CPC ............. F01N 2590/10; F01N 2490/06; F01N 2610/08; F01N 2610/02; F01N 3/2066; F01N 13/0097
USPC ......................................... 422/168–170, 180
See application file for complete search history.

(56) References Cited

U.S. PATENT DOCUMENTS 6,444,177 B1 * 9/2002 Muller ............... B01D 53/8631
422/172
7,264,785 B2    9/2007 Blakeman et al.
(Continued)

FOREIGN PATENT DOCUMENTS

EP     0898643 A1    3/1999
EP     1235976 A2    9/2002
(Continued)

*Primary Examiner* — Tom P Duong

(57) ABSTRACT

A compact Selective Catalytic Reduction (SCR) system comprising a system inlet, a gas flow system and a plurality of catalyst clusters is described. The system inlet is configured to utilize heat of the cleaned exhaust to vaporize a solution of a reductant, or a precursor of a reductant, and to mix the vaporized reductant with exhaust gas to form a mixed gas. The gas flow system is configured to provide the mixed gas from the system inlet to a plurality of catalyst clusters and to provide heat from the exhaust gas to assist in vaporization of the reductant/precursor and to assist in the conversion of the precursor to the reductant. The plurality of catalyst clusters comprise SCR and ASC catalysts but can also include filter functionality.

13 Claims, 4 Drawing Sheets

(52) U.S. Cl.
CPC ...... *F01N 2610/02* (2013.01); *F01N 2610/08* (2013.01); *Y02T 10/24* (2013.01)

(56) References Cited

U.S. PATENT DOCUMENTS

| | | | |
|---|---|---|---|
| 8,105,560 B2 | 1/2012 | Phillips et al. | |
| 8,413,425 B2* | 4/2013 | Tanioka | B01D 53/9409 60/274 |
| 2016/0090887 A1* | 3/2016 | Mitchell | F01N 3/208 60/274 |

FOREIGN PATENT DOCUMENTS

| | | |
|---|---|---|
| EP | 1458960 A2 | 9/2004 |
| WO | 9743528 A1 | 5/1997 |
| WO | 0142630 A2 | 6/2001 |
| WO | 03054364 A3 | 7/2003 |
| WO | 2011147556 A1 | 12/2011 |
| WO | 2012157066 A1 | 11/2012 |

\* cited by examiner

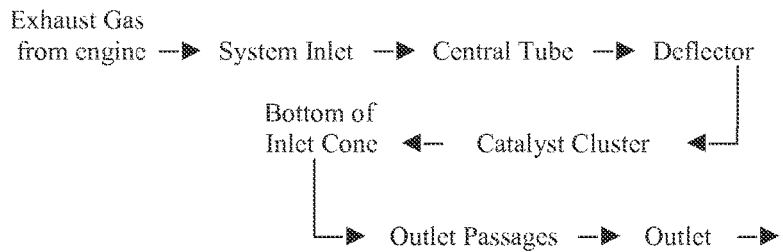

Fig. 1

Exhaust Gas from engine → System Inlet → Central Tube → Deflector

Bottom of Inlet Cone ← Catalyst Cluster ←

→ Outlet Passages → Outlet →

Fig. 2.

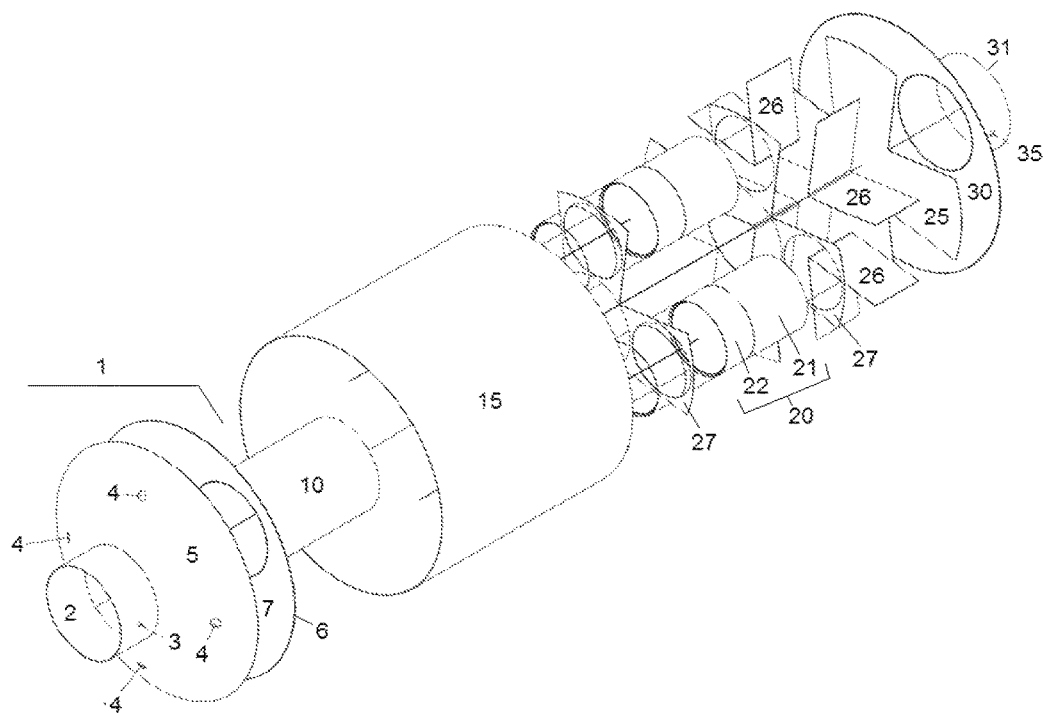

| 1 | System Inlet | 7 | Initial Mixing Zone | 25 | Deflector |
| 2 | Inlet | 10 | Central Tube | 26 | Partition |
| 3 | Sensor | 15 | Outer Shell | 27 | Support |
| 4 | Injector* | 20 | Catalyst Cluster | 30 | Outlet cone |
| 5 | Cover | 21 | SCR catalyst | 31 | Outlet |
| 6 | Inlet Cone | 22 | ASC | 35 | Sensor |

* The injector is an example of a means for introducing an aqueous solution of a reductant or a reductant precursor into an initial mixing zone.

(a)   (b)   (c)   (d)

COMPACT CYLINDRICAL SELECTIVE CATALYTIC REDUCTION SYSTEM FOR NITROGEN OXIDE REDUCTION IN THE OXYGEN-RICH EXHAUST OF 500 TO 4500 KW INTERNAL COMBUSTION ENGINES

BRIEF DESCRIPTION OF INVENTION

The invention concerns a compact Selective Catalytic Reduction system (SCR) for the reduction of NOx in which a stream of hot exhaust gas provides heat for the decomposition of the urea into its active components including ammonia. A compact system comprising a system inlet, a central tube, a gas flow system and a plurality of catalyst clusters is described. The system inlet is configured to receive hot exhaust gas from an engine and to mix the hot exhaust gas with vapors from a solution comprising a reductant or a reductant precursor and to transfer the reductant to the flow system where it reacts in the SCR catalyst. Clean gas leaves the SCR catalyst, passes through a portion of the system, and then exits the system. The configuration of the compact system allows for increased decomposition of urea into the active reductant compared to state of the art systems used with 500 to 4500 Kilowatt (kW) engines.

BACKGROUND OF THE INVENTION

The selective catalytic reduction (SCR) of nitrogen oxides ($NO_x$) in flue gases is used in many industries worldwide to comply with national and international emission legislation. Nitrogen oxides formed in the combustion process of fossil and renewable fuels are reduced with a reductant, such as ammonia, on a catalytic surface. Various catalysts have been used on a variety of substrates, such as vanadium oxides, ion-exchanged zeolites etc. The catalysts can be prepared in different formulations and can be present in different forms, such as extruded or coated honeycombs, metal substrates etc. One of the major factors that determine the selection of the appropriate catalyst is the temperature of the flue gas. While ammonia is preferred as a reductant, the direct use of ammonia is problematic due to the hazardous nature of gaseous ammonia. Therefore, substances that are easy to handle and decompose to form ammonia when injected into the hot flue gases are normally used. For example, an aqueous urea solution decomposes at temperatures above 140° C. to form ammonia and isocyanic acid (HNCO), which then decomposes to form ammonia and carbon dioxide. However, the generation of ammonia from an aqueous urea solution is a relatively slow process. If the residence time of urea in the hot gas stream is too short, this can lead to precipitation on the reactor walls or worse, on the catalyst. Therefore, relatively long injection ducts with a length of several meters are located upstream of the actual catalyst used in current state of the art SCR applications. These long ducts are typically a straight tube through which the exhaust flows and in which the reductant is injected into the hot gas stream by means of an injector or a lance.

The SCR systems described above have generally been used on large, stationary systems, such as power plants. Smaller SCR systems have been used in automotive applications and in engines generally below 600 kW. These smaller SCR systems have different designs due to lower exhaust volumes and therefore, a smaller mass flow of reductant needed to be introduced into the system. Recently, emission regulations for the 500 to 4500 Kilowatt (kW) diesel and gas engines have been established for the marine, off-road and power generation sectors. Currently the systems used in engines of these sizes consist of a long exhaust pipe (up to around 10 m) with a large diameter (up to around 0.6 m) and a SCR catalyst located in the flow of the exhaust gas. An aqueous urea solution is injected directly in the exhaust gas by means of a lance. The urea subsequently converts to ammonia in the full exhaust gas flow. To achieve a uniform ammonia concentration pattern across the catalyst cross section, the flow is deliberately disturbed by static mixers. Often, the ammonia is directly introduced through an ammonia injection grid (AIG) into the full exhaust flow before being passed through one or multiple mixers and then the SCR catalyst. Therefore, uneven flow distributions can result in spots with low temperature sections leading to precipitation or corrosion from the partly decomposed urea. These urea losses also result in a decrease in NOx conversion activity because precipitated material cannot participate in the reaction to convert urea to ammonia.

Space is a crucial factor in applications for marine, off-road and power generation sectors and the use of space can affect the economics of operation in these sectors. For example, a super yacht or a ferry might lose passenger space directly resulting in lost income. Large mining excavators and trucks would need to reduce the loads that they can move or carry, resulting is the need to perform additional excavations or make additional trips in order to move the same amount of material. In certain vehicles, such as tug boats, the machine rooms may not have the space required to install the current state of the art SCR set-up.

The compact SCR system described herein allows for the use of urea in reducing the levels of nitrogen oxides ($NO_x$) in exhaust gases using an SCR process in engines having a size in which exhaust aftertreatment system space constraints had previously been an obstacle to their use. One of the advantages of the compact SCR system described herein is that the system, in addition to being able to be used with new engines in the sectors described above, also allows for the installation of aftermarket systems so that existing engines will be able to reduce their emissions as well.

SUMMARY OF THE INVENTION

A compact selective catalytic reduction (SCR) system comprising a system inlet, a central tube, a gas flow system and a plurality of catalyst clusters is described. The system inlet comprises an inlet, and an initial mixing zone, with the inlet being configured to receive exhaust gases from an engine and being in fluid communication with the initial mixing zone. The initial mixing zone comprises a plurality of means for introducing a reductant, or a reductant precursor, into exhaust gas in the initial mixing zone. The initial mixing zone is in fluid communication with a central tube. The initial mixing zone comprises at least one surface in thermal communication with the gas flow system. A central tube is located about an axis of symmetry that run through the system and is in fluid communication with the both the system inlet and a gas flow deflector in the gas flow system. The gas flow system comprises (i) a gas flow deflector, (ii) a plurality of passages, and (iii) and an outlet zone comprising an outlet cone and an outlet in fluid communication with the outlet cone. There are two primary configurations of the exhaust flow system. In one configuration, gas leaving the gas flow deflector enters a catalyst cluster, then changes direction and passes through a plurality of passages to an outlet zone. In another configuration, gas leaving the gas flow deflector enters a plurality of passages located adjacent to an outer shell, changes direction, passes through a plurality of catalyst clusters, and then passes to an outlet zone.

Many of the preferred aspects of the invention are described below. Equivalent compositions are contemplated.

BRIEF DESCRIPTION OF THE DRAWINGS

The invention will be better understood and its advantages will become more apparent from the following detailed description, especially when taken with the accompanying drawings.

FIG. 1 shows a generalized flow of gases in an example of a compact SCR system.

FIG. 2 is an exploded view of an example of a compact SCR system showing components of the system.

DETAILED DESCRIPTION OF THE INVENTION

Figure 3:
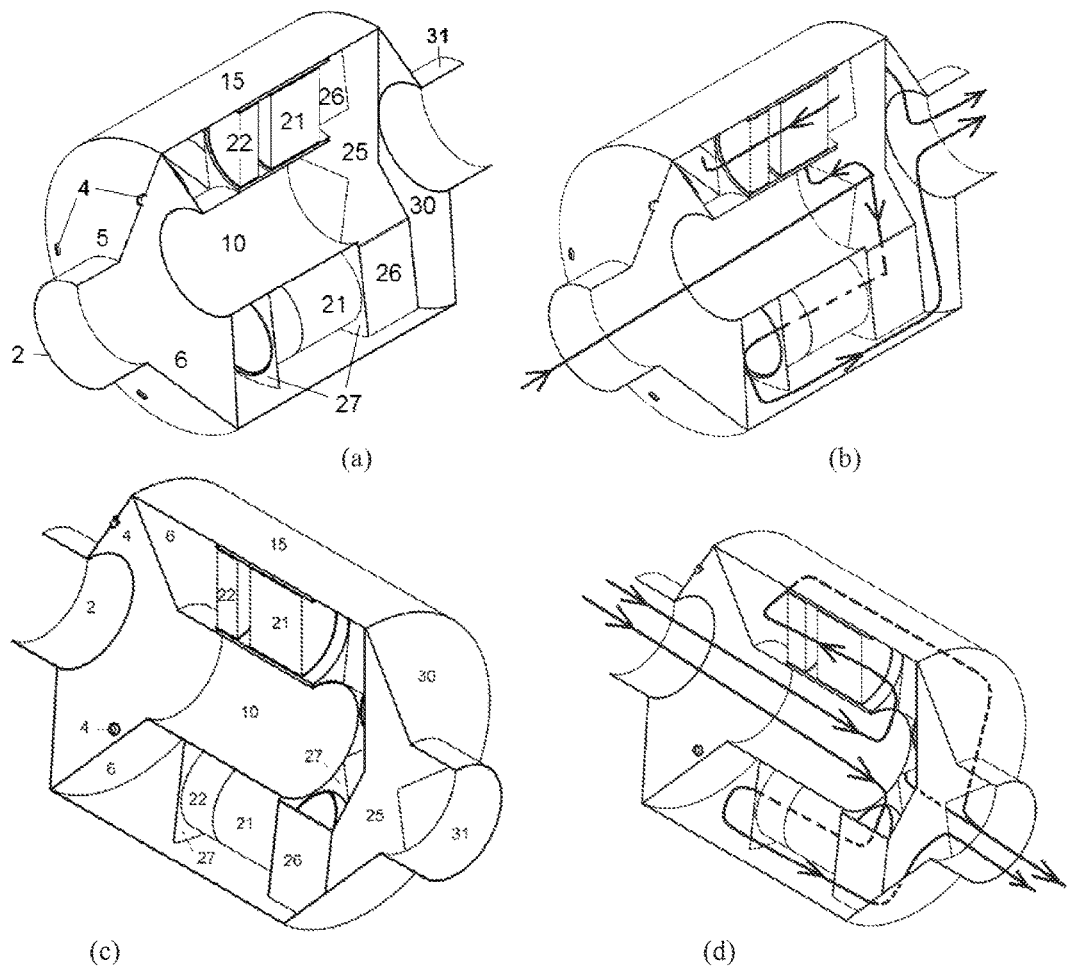
FIG. 3 is a representation of a cross-sectional view of an example of a compact SCR system showing the location of the components and the flow of gases through the SCR system.

The invention provides an SCR system comprising a system inlet, a central tube, a gas flow system and a plurality of catalyst clusters. Several examples will be described, with some in preferred forms.

In one aspect of the invention, a Selective Catalytic Reduction (SCR) system comprises a system inlet, a central tube, a gas flow system and a plurality of catalyst clusters; wherein:
  a. the system inlet comprises an inlet, and an initial mixing zone, the inlet being configured to receive exhaust gases from an engine and being in fluid communication with the mixing zone, the mixing zone comprising a plurality of means for introducing a reductant, or a reductant precursor, into exhaust gas in the mixing zone, the mixing zone being in fluid communication with a central tube, the mixing zone comprising at least one surface in thermal communication with the gas flow system;
  b. the central tube being in fluid communication with the system inlet and the gas flow system;
  c. the gas flow system comprises (i) a gas flow deflector, (ii) a plurality of passages, and (iii) an outlet zone comprising an outlet cone and an outlet in fluid communication with the outlet cone, the gas flow deflector being in fluid communication with the central tube and either:
    i. a plurality of catalyst clusters, wherein the plurality of catalyst clusters is in fluid communication with a plurality of passages in fluid communication with the outlet zone; or,
    ii. a plurality of passages in fluid communication with a plurality of catalyst clusters, wherein the plurality of catalyst clusters are in fluid communication with the outlet zone; and
  d. each catalyst cluster comprises a SCR catalyst.

The means for introducing a reductant, or a reductant precursor, into exhaust gas in the mixing zone can be an injector or a nozzle.

The system inlet can further comprise at least one additional nozzle configured to control the shape of a droplet pattern formed by the at least one aerosol forming device.

The SCR catalyst can be in the form of a monolith or a particulate filter and can have a square, rectangular or circular shape in the net direction of gas flow through the monolith.

The catalyst cluster can further comprise an ammonia slip catalyst.

The SCR system can further comprise a particulate filter or an oxidation catalyst.

The SCR system can further comprise a means for controlling the introduction of urea or an ammonia precursor. The means for controlling the introduction of urea or an ammonia precursor comprises at least one of a NOx sensor, an $NH_3$ sensor and a temperature sensor.

In another aspect of the invention, methods of reducing the amount of nitrogen oxides formed in the exhaust from an engine comprise passing exhaust gas from the engine through an SCR system having the various components described herein.

The configuration of the system allows for a longer residence time and therefore better decomposition efficiency of the reductant precursor compared to state of the art systems used with 500 to 4500 Kilowatt (kW) engines. Furthermore, the system described here has an even smaller footprint.

The descriptions below provide details of various example configurations of Selective Catalytic Reduction (SCR) systems.

The system provides a reactant, preferably ammonia, which can react to reduce the levels of $NO_x$ in the exhaust gas. The reactant can be formed by converting a compound that can form ammonia, such as urea, into the reactant in the gas phase, combining the gas containing the reactant with exhaust gas containing $NO_x$ and then passing the combined gases through an SCR catalyst. In order to convert the urea to ammonia, an aqueous solution of urea is injected into a mixing zone in the system inlet. In addition to heat from the exhaust gas that is mixed with the reductant, additional heat from the mixed exhaust gas is transferred through at least one wall in the mixing zone. The enthalpy of the cleaned exhaust gas and of the SCR reaction after the mixture of ammonia and exhaust gas is passed through the SCR catalyst can therefore be used to vaporize the solution of urea.

The apparatus and process described herein is effective with urea, but can utilize other $NO_x$-reducing reagents, either ammonia-forming or other $NO_x$-reducing reagents, capable of forming a reactant gas upon heating. The reactions that occur are well known in the art. A summary of these reactions are described in U.S. Pat. Nos. 8,105,560 and 7,264,785, each of which are incorporated by reference in its entirety.

The term "urea" is meant to include urea, $CO((NH_2)_2)$ and reagents that are equivalent to urea because they form ammonia and HNCO when heated. Other $NO_x$-reducing reagents known in the art can also be used. $NO_x$-reducing reagents that do not form urea or HNCO, but react with compounds present in exhaust gas to reduce the levels of $NO_x$, can be used.

The volume of urea solution introduced into the vaporizer module is dependent upon both the $NO_x$ mass flow and the concentration of urea in the solution. The amount of urea introduced is related to the $NO_x$ concentration based on the stoichiometry of the reactions involved, the temperature of the raw exhaust gas and the catalyst to be used. The amount of urea used is related to the "NSR", which refers to the relative equivalents of nitrogen in the urea, or other $NO_x$-reducing agent, to the equivalents of nitrogen in the $NO_x$ in the gases to be treated. The NSR can range from about 0.1 to about 2, but preferably is within the range from 0.6 to 1.2, inclusive.

The SCR catalyst used in the compact SCR system described herein can be selected from those known in the art as being capable of reducing the concentration of nitrogen oxides in the presence of ammonia. These include, for example, zeolites, oxides of vanadium, tungsten, titanium, iron, copper, manganese, and chromium, noble metals such as the platinum group metals platinum, palladium, rhodium, and iridium, and mixtures thereof. Other SCR catalyst materials conventional in the art and familiar to the skilled artisan, such as activated carbon, charcoal or coke, can also be utilized. Preferred catalysts include transition metal/zeolites e.g. Cu/ZSM-5 or Fe/Beta; vanadia-based catalysts such as $V_2O_5/WO_3/TiO_2$; or non-zeolite transition metal catalysts such as $Fe/WO_x/ZrO_2$.

These SCR catalysts are typically mounted on a support such as a metal, ceramic, zeolite, or are extruded as a homogeneous monolith. Other supports known in the art can also be used. It is preferred that the catalysts are coated onto a flow-through monolith substrate, a filter substrate or in an extruded form. Most preferable, the catalysts are coated onto a flow-through monolith substrate or are in an extruded form. It is preferred that these catalysts are present in or on a honeycomb flow-through support. For a small volume SCR system, SCR catalysts with relatively high cell densities are preferable, for example 45 to 400 cells per square inch (cpsi), more preferable 70 to 300 cpsi and even more preferable 100 to 300 cpsi.

The SCR catalyst is preferably in the form of circular monoliths or on particulate filters, known in the art as SCRF. The SCR catalyst can have any of a number of cross-sectional shapes perpendicular to the direction of the gas flow, including circular, portions of a circle, hexagonal, square, and rectangular, with circular or portions of a circle or square being preferred due to the spatial limitations of the system. The SCR system can comprise an ammonia slip catalyst located downstream of the SCR catalyst.

An oxidation catalyst can be positioned in the exhaust stream from the engines before it enters the SCR system or can be placed at the inlet before the cover 5 (upstream of the urea input) to reduce hydrocarbons, which may decrease SCR activity. The oxidation catalyst also oxidizes CO, aromatics, etc.

A generalized flow of gases in one example of a compact SCR system is shown in FIG. 1. Exhaust gas from the engine passes into the system inlet 1, and then passes through a central tube 10, positioned around the central axis of the SCR system. After passing down the central tube, the mixed gas encounters a deflector 25 that changes the direction of the gas flow back towards the system inlet 1. The mixed gas then passes through a catalyst cluster 20, which can comprise a SCR catalyst 21 followed by an ammonia slip catalyst (ASC) 22 and cleaned gas is formed. The cleaned gas flows from the catalyst clusters onto the bottom of the inlet cone 6 and is then directed through outlet passages formed between the outer shell 15, the catalyst clusters 20 and the partitions 26 back towards the outlet cone. The cleaned gas then impinges on the outlet cone 30 and leaves the SCR system through outlet 31.

FIG. 2 shows a representation of an exploded view of a configuration of a compact SCR system showing the various components. The configuration of the components allows for the gas flow described in FIG. 1. The compact SCR system can receive exhaust gases from an engine generating between about 500 kW and about 1000 kW (1 MW), or from about 1000 kW (1 MW) to about 2000 kW (2 MW), or from about 2000 kW (2 MW) to about 4500 kW (4.5 MW). Engine exhaust gas flows into the SCR system through the system inlet 1, which comprises inlet 2, a plurality of means for introducing an aqueous solution of a reductant or a reductant precursor 4, a cover 5, and an inlet cone 6. The system inlet can further comprise one or more sensors 3, such as a NOx sensor. The system can use information from one or more NOx sensors on the exhaust of the engine. The exhaust gas enters the system at inlet 2, and then moves into an initial mixing zone 7 between cover 5 and inlet cone 6. The system preferably contains at least one NOx sensor 3 located on the inlet or uses one or more NOx sensors on the engine. The cover 5 contains a plurality of injectors, preferably four, through which a solution containing a reductant, or a reductant precursor, preferably urea, is fed. The solution containing the reductant, or a reductant precursor, is vaporized and mixed with the exhaust gas to form a mixed gas in the initial mixing zone 7 between cover 5 and inlet cone 6. The mixed gas then flows through the central tube 10, located along the axis of symmetry of the system. Heat from the exhaust gas transfers to the cover 5, the inlet cone 6 and the central tube 10. The inlet cone 6 and central tube 10 function as heat exchangers. This heat assists in the vaporization of the solution of the reductant, or a reductant precursor, and in the conversion of the reductant precursor to the reductant.

After passing through the central tube 10, the mixed gases impinge on deflector 25. The deflector 25 shown in FIGS. 2-6 diverts the flow into four subflows. Depending upon the size and operating properties of the engine from which the exhaust gas is provided, the deflector may be configured to divide the flow into a different number of subflows than the four shown in the figures. A plurality of partitions 26, preferably four, are positioned on or against the deflector and an outer shell 15 and split the mixed gas flow into a plurality of subflows. The number of partitions in the system depends upon the number of catalyst clusters and therefore the configuration of the deflector 25. The partitions are located and configured to reverse the direction of gas flow relative to the axis of symmetry of the system and cause the gas to flow back towards the system inlet 1. Each of the subflows of gas then passes through a catalyst cluster 20 which comprises an SCR catalyst 21 and then preferably an ASC 22. The figures show a system with four catalyst clusters. The number of catalysts clusters depends upon the configuration of the deflector 25 and the number of subflows into which the flow is divided. The figures show the use of SCR catalysts 21 and ASC 22 having circular cross-sections in the direction of the gas subflows. The catalysts may have any shapes, such as circular, oval, semicircular, square and rectangular. After passing through the catalyst cluster 20, each subflow impinges on the inlet cone 6 and the direction of gas flow is again reversed relative to the axis of symmetry of the system. The cleaned exhaust gas then flows away from system inlet 1 towards outlet cone 30 through outlet passages formed between the outer shell 15, catalyst clusters 20 and partitions 26. The cleaned gas then impinges on the outlet cone 30 and leaves the SCR system through outlet 31.

The cover 5 comprises a means for introducing an aqueous solution of a reductant or a reductant precursor, such as urea, into an initial mixing zone 7 between the cover 5 and inlet cone 6. Inlet cone 6 and central tube 10 can function as heat exchangers, allowing heat to transfer from the hot exhaust gas from the engine to various components and gases within the SCR system. The aqueous solution of reductant or a reductant precursor is maintained at a concentration suitable for storage and handling without precipitation or other problems. The concentration of urea in the aqueous solution can range from about 5 to 70%, preferably from about 15 to about 60%, more preferably from about 30 to about 40%. The means for introducing an aqueous solution of urea can comprise an injector under liquid pressure, a nozzle that uses air for spray formation (pre-evaporation) of the urea solution or an airless nozzle. An injector is preferred as means for introducing an aqueous solution of a reductant or a reductant precursor. Various types of nozzles that use air are commercially available from a number of sources. For an engine size between 500 and 4500 kW, commercially available nozzles that can be used with urea only require low pressure vaporization air, which can be supplied by a relatively small compressor. Currently available, one-phase, airless nozzles for the urea mass flows necessary for cleaning the exhaust of engines between 500 and 4500 kW need very high liquid pressures to operate at varying mass throughputs in one operation cycle. However, nozzle manufacturers are researching and developing low pressure one-phase nozzles with adaptable mass throughputs. Airless systems can have lower investment and operating costs and may have a lower potential of system failures because they have fewer components. Airless injection systems may be especially attractive for compact SCR systems for which space is constraint and for which long warranty periods (e.g. two and more years) are requested and the engine has a high annual utilization (of e.g. 8000 hours per year) such as marine, power generation, mining etc. Other types of atomizers can also be used.

Heat needed for the complete evaporation of the water and decomposition of urea into ammonia is supplied by the heat of the exhaust and the transfer of heat from the cleaned exhaust gas through the heat exchange functionality of the inlet cone 6 and the central tube 10.

The SCR system can use one or more of the outer shell 15, the inlet cone 6 and the outlet cone 30 to preheat secondary vaporization air. Preheated secondary vaporization air may be used to control or adjust the spray pattern of the urea solution as it forms after leaving an injector or nozzle. Therefore, it provides a means to control and/or adjust the distribution of urea and ammonia or another reductant in the exhaust gas, therefore provides control of the aqueous urea evaporation/decomposition time and, therefore the possibility to achieve the highest possible NOx reduction at the lowest possible ammonia slip.

An aqueous urea solution can be atomized using a commercial nozzle with the help of pressurized, primary vaporization air. Primary vaporization air is air used to convert the solution containing the reductant into droplets. Pressure of only a few hundred millibar to a few bar can be sufficient to obtain droplets with diameters of a few tens of millimeters to a few tens of micrometers, even at varying mass throughputs. Therefore, a compact device, such as a rotary piston fan, side channel blower, etc. can be used rather than a large air compressor as is currently used in state of the art installations. The pressurized air can also be used as secondary vaporization air in forming a desired spray profile formed by the droplets. A portion of the secondary vaporization air can be blown through two separate nozzles into the primary aqueous urea spray to elongate the spray profile to a flat jet for increased heat and mass transfer surface. Because of the low spray/vapor velocity and the relatively high temperature in the initial mixing zone 7, complete or near complete thermolysis of urea into ammonia and isocyanic acid is anticipated. Furthermore, due to the very high local concentration of steam (formed from the volatilization of water in the aqueous urea solution) and the absence of diluting exhaust gas in the initial mixing zone 7, urea is expected to rapidly hydrolyze to isocyanic acid before it is mixed with the exhaust gas in the initial mixing zones.

Secondary vaporizer air can also be fed into the system inlet through at least one, preferably two or more, nozzles to create a flat spray or a swirl flow in the initial mixing zone in order to increase the heat transfer from the walls into the spray. Secondary vaporization air can be heated before it is directed to the nozzles. The heating may be performed by any known means, preferably electrically, more preferably by exhaust gas passing through a tube heat exchanger located on outer shell 15, the cover 5 or the outlet cone 30. The total mass flow and pressure of the secondary vaporization air stream is determined by the desired spray elongation pattern and the desired swirl flow pattern, as well as, the desired pressure and temperature in the initial mixing zone 7. The walls of cover 5 and inlet cone 6 can also provide catalytic activity for the hydrolysis of a reductant precursor.

FIG. 3 shows cross-sectional views of an example of a compact SCR system showing the location of the components (Figs. (a) and (c)) and the flow of gases (Figs. (b) and (d)) through the SCR system. FIGS. 3(a) and 3(c) show the same cross-section with the orientation of the cross-section being shown at different angles. These figures show inlet 2, cover 5, injectors 4 and inlet cone 6 of the system inlet. Inlet cone 6 is in fluid communication with central tube 10. Deflector 25 is located after the end of the central tube 10, with a space formed by partition 26 between the end of the central tube 10 and deflector 25. The deflector 25 can comprise one or more coatings comprising one or more catalysts that can assist in hydrolyzing urea or other reductant precursors. A plurality of catalyst clusters containing an SCR catalyst 21 and an ASC 22 are located around the central tube 10. Two supports 27 hold the catalyst clusters in place between the central tube 10 and the outer shell 15. The inlet cone 6 is located near the end of the catalyst clusters with a space between the catalyst clusters 20 and the inlet cone 6. This space provides passages for clean exhaust gas leaving the catalyst cluster to flow onto inlet cone 6 where it transfers heat into the initial mixing zone 7 before it is turned around before impinging on the outlet cone 30 and then leaving through the outlet 31.

FIGS. 3 (b) and (d) depict the gas flow in an example of a compact SCR system having a gas flow pattern as described in FIG. 1. The part numbers of the various elements are shown in FIGS. 3(a) and (c) as described above. Hot exhaust gas enters the compact SCR system through the inlet 2 to the SCR system. The gas flows upward through an initial mixing zone between cover 5 and inlet cone 6. The net flow pattern of gases in the initial mixing zone is shown by a simple line. The flow pattern within the initial mixing zone is not shown due to the complexity of mixing the hot exhaust gas from the engine with vaporized reductant, or reductant precursor, introduced into the system through injector 4 to form a mixed gas. The mixed gas travels through central tube 10, then impinges on deflector 25, changes direction and splits into subflows between partitions 26 into the catalyst clusters where it passes through the SCR catalyst 21 and then through the ASC 22.

After exiting the catalyst cluster, the clean exhaust gas impinges on inlet cone 6, changes direction and flows through space between the catalyst clusters 20 and the outer shell 15. The cleaned gas then impinges on the outlet cone 30 and leaves through the outlet 31.

When the exhaust gas passes through the SCR catalyst 21, NOx in the exhaust gas reacts with reductant on the catalyst surface and the amount of $NO_x$ in the exhaust gas is reduced. For the SCR reaction to be effective in reducing NOx levels, the temperature of the combustion gases including the gasified urea should be at least about 100° C., typically between about 180° and about 650° C., and preferably above at least about 250° C. The composition, form and especially the volume of the catalyst can be selected based on the temperature of the gases in the SCR catalyst, as well as, the NOx load to provide for a reduction in the catalytic reduction of nitrogen oxides. The system preferably comprises an ammonia slip catalyst (ASC) 22 positioned in the exhaust gas flow downstream of the SCR catalyst 21.

The compact SCR system does not use an ammonia injection grid (AIG) as is often used, or required, in traditional SCR processes.

The compact SCR system can further comprise a means to access the SCR catalyst to replace the catalyst. Preferably, the means comprises a mechanical fastening system, such as a plurality of nuts and bolts, which connect the cover 5 and inlet cone 6 or the outlet cone 30, to the outer shell 15.

The compact SCR system can further comprise various sensors, such as one or more NOx sensors, an $NH_3$ (ammonia) sensor, and temperature sensors. An $NH_3$ sensor would preferably be placed at the outlet of the SCR system to measure the ammonia slip through the SCR system. The NOx and/or $NH_3$ and/or temperature sensors can be linked to a unit that controls the amount of urea and, if applicable, vaporization air and, if applicable, clean gas that is transferred into the vaporizer module and subsequently into the exhaust gas. A NOx sensor, and optionally a temperature sensor, can be located at the system inlet, preferably in the inlet 2. A NOx or $NH_3$ sensor can be located downstream of the SCR catalyst, preferably on the outlet, and can be used for closed-loop control.

Exhaust gas from double stage (e.g. V-cylinder) engines having power of 500 to 4500 kW can be connected together before entering the inlet of the compact SCR system.

Figure 4:
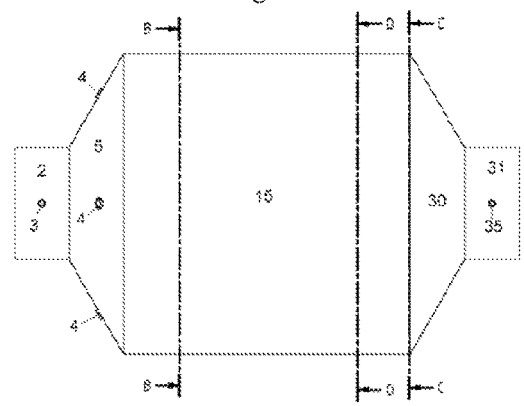
FIG. 4 is a side view of an example compact SCR system.

FIG. 4 is a side view of an example compact SCR system. Inlet 2 contains a sensor 3, preferably a NOx sensor, and is connected to cover 5, which contains a plurality of injectors 4 (three are shown in this view). The cover 5 is connected to outer shell 15 which is connected to outlet cone 30. Outlet cone 30 is connected to outlet 31, which preferably contains at least one sensor 35. Exhaust gas from the engine enters the SCR system through inlet 2 and clean exhaust gas, after passing through the SCR catalyst (not shown) within the outer shell 15, exits the SCR system through outlet 31. The locations of three transects (B-B, C-C and D-D) through the outer shell 15 are also shown.

Figure 5:
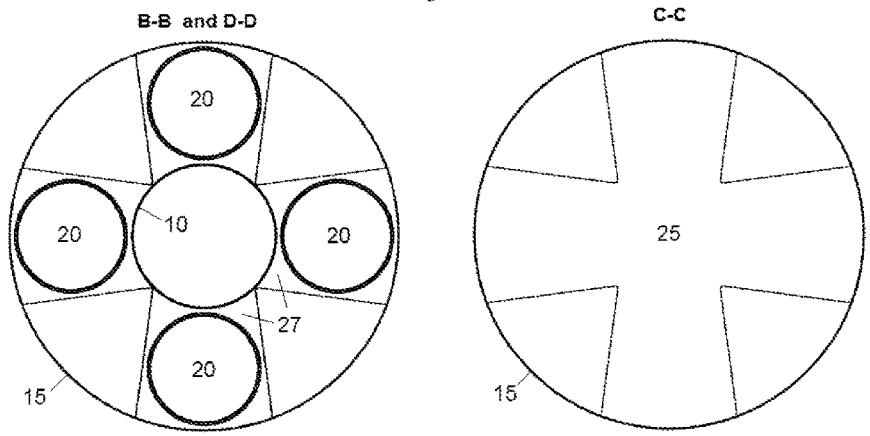
FIG. 5 is a representation of cross section B-B, C-C and D-D of a compact SCR system shown in FIG. 4.

FIG. 5 shows a representation of cross section B-B, C-C and D-D of a compact SCR system shown in FIG. 4. The cross sections B-B and D-D are the same and contain the central tube 10 in the middle of the support 27 with four catalyst clusters 20 contained within each of the four arms of the support 27. The support is in contact with, or connected to, the outer shell 15. Cross section C-C contains the deflector 25 which is in contact with, or connected to, the outer shell 15.

Figure 6:
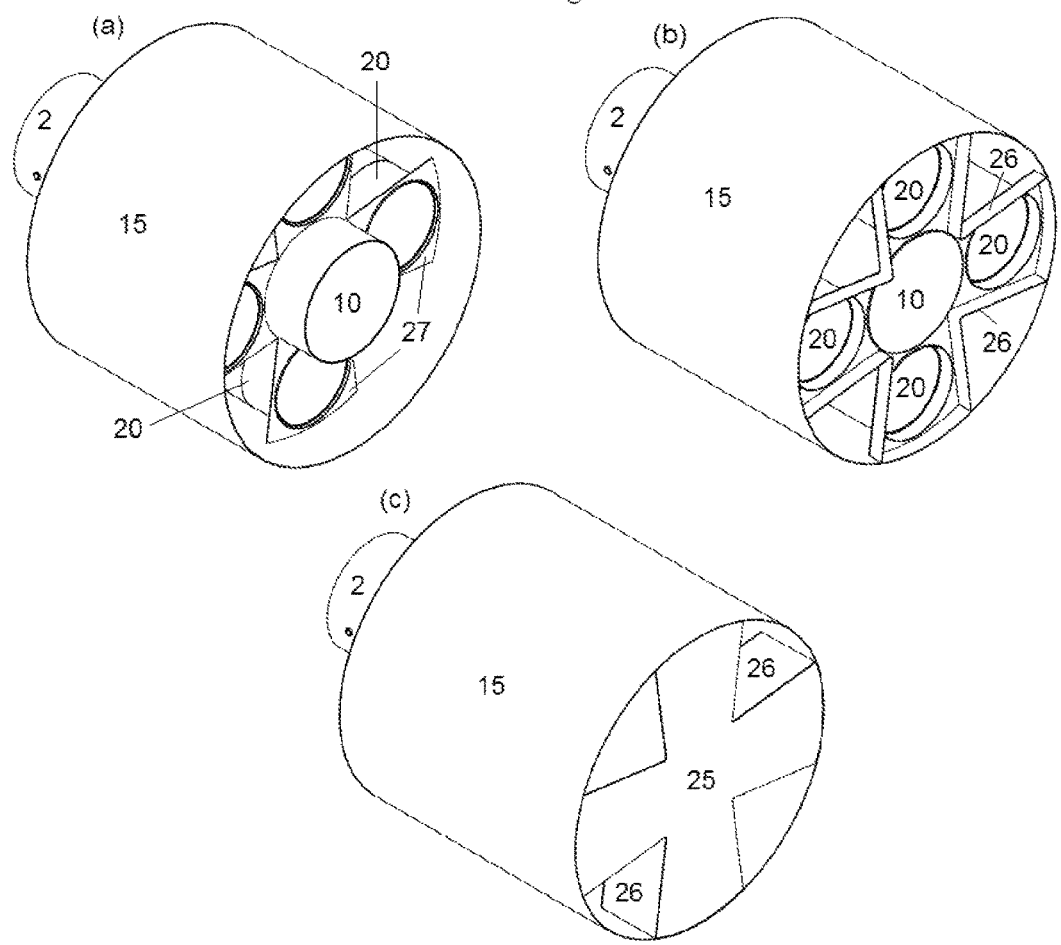
FIG. 6 is a representation showing the assembly of some components in an example SCR system.

FIG. 6(a-c) is a representation showing the assembly of some components in an example SCR system. Each of these figures shows inlet 2 and outer shell 15. FIG. 6(a) also shows the central tube 10 in the middle of the support 27 with four catalyst clusters 20 contained within each of the four arms of the support 27. The support is in contact with, or connected to, the outer shell 15. FIG. 6(b) shows the addition of the partitions 26. The partitions are oriented with the exposed edges of support 27 (see FIG. 6(b)). FIG. 6(c) shows the addition of the deflector 25 against, or connected with, partitions 26 and outer shell 15.

Figure 7:
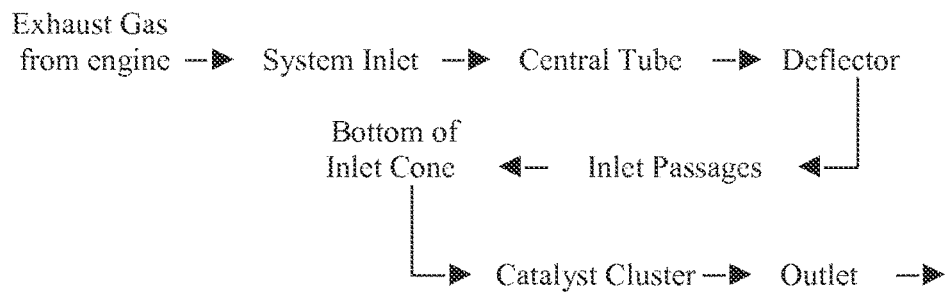
FIG. 7 shows a generalized flow of gases an example of another compact SCR system.

A generalized flow of gases in another example of a compact SCR system is shown in FIG. 7. Exhaust gas from the engine passes into the system inlet 1, and then passes through a central tube 10, positioned around the central axis of the SCR system. After passing down the central tube, the mixed gas encounters a deflector which breaks the flow of mixed gas into a plurality of subflows and changes the direction of gas flow back toward to the inlet. The mixed gas subflows pass through inlet passages formed between the outer shell 15, catalyst clusters 20 and partitions 26 and then contact the bottom of the inlet cone. The gas then is directed through a catalyst cluster 20, which comprises an SCR catalyst 21 followed by an ammonia slip catalyst (ASC) 22 and cleaned gas is formed. The cleaned gas then impinges on the outlet cone 30 and leaves the SCR system through outlet 31.

The configuration of the system used in the flow shown in example in FIG. 7 is similar to the configuration of the systems described in FIGS. 1-6 except that the deflector 25 is rotated to change the passage of the gas flow.

Figure 8:
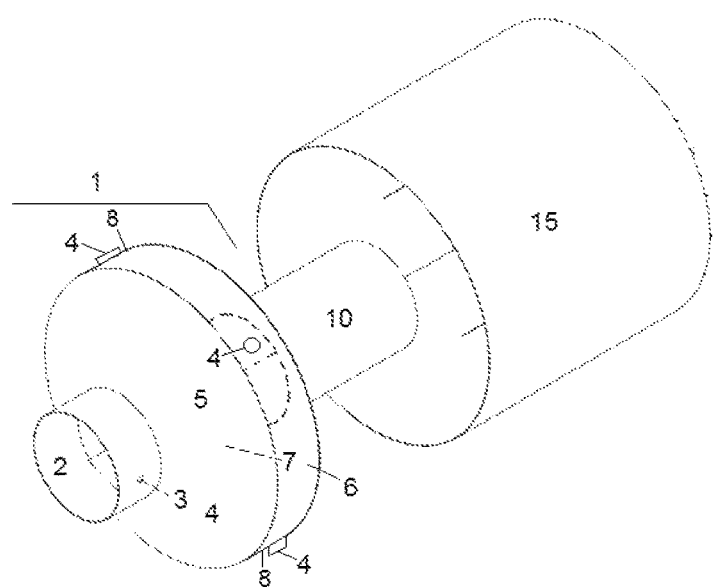
FIG. 8 is an exploded view of an example inlet of a compact SCR system showing components of the inlet.

The inlet to the compact SCR system can be modified for use in the compact SCR system described above and can also be used in other types of SCR systems. A Selective Catalytic Reduction (SCR) system inlet can comprise an inlet, a mixing zone, an outlet and a plurality of means for introducing an aqueous solution of a reductant or a reductant precursor, where inlet is in fluid communication with the mixing zone and the mixing zone is in fluid communication with the outlet, the mixing zone is formed by a cover, a wall and an inlet cone, where the wall is located between the cover and the inlet cone, and the plurality of means for introducing an aqueous solution of a reductant or a reductant precursor are located on the wall. FIG. 8 shows a representation of an exploded view of a configuration of an inlet for a compact SCR system showing the various components. Engine exhaust gas flows into the SCR system through the system inlet 1, which comprises inlet 2, a plurality of means for introducing an aqueous solution of a reductant or a reductant precursor 4, a cover 5, and an inlet cone 6. The system inlet can further comprise one or more sensors 3, such as a NOx sensor. The system can use information from one or more NOx sensors on the exhaust of the engine. The exhaust gas enters the system at inlet 2, and then moves into an initial mixing zone 7 between cover 5 and inlet cone 6. The initial mixing zone 7 is contained within wall 8 between the cover 5 and the inlet cone 6. The wall 8 is shown as having a cylindrical shape in FIG. 9. The wall can be in the form of other shapes, such as a square, pentagon, hexagon, etc. depending upon the shape of the SCR system to which the inlet is being attached. The wall 8 contains a plurality of injectors, preferably more than two, through which a solution containing a reductant, or a reductant precursor, preferably urea, is fed. Preferably, the injector is of airless-type meaning a liquid reductant solution-only injector. Due to the geometry of the initial mixing zone 7, a very low exhaust gas momentum occurs at the tip of an injector 4. Therefore, an injector's spray pattern can fully develop, leading to small droplet diameters, therefore, high droplet surface area and thus increased evaporation rates. The solution containing the reductant, or a reductant precursor, is vaporized and mixed with the exhaust gas to form a mixed gas in the initial mixing zone 7 between cover 5, inlet cone 6 and wall 8. The mixed gas then flows through the central tube 10, located along the axis of symmetry of the system towards the SCR catalysts. The system preferably contains at least one NOx sensor 3 located on the inlet or uses one or more NOx sensors on the engine.

Figure 9:
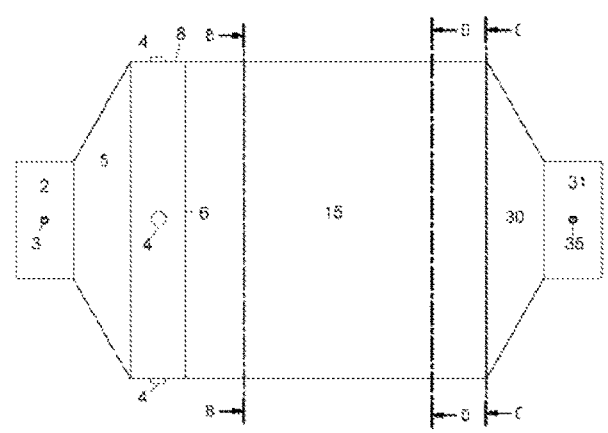
FIG. 9 is a side view of an example compact SCR system showing the location of the wall of the inlet.

FIG. 9 is a side view of an example compact SCR system. Inlet 2 contains a sensor 3, preferably a NOx sensor, and is connected to cover 5, which contains a plurality of injectors 4 (three are shown in this view). The cover 5 is connected to wall 8 which is connected to outer shell 15 which is connected to outlet cone 30. Outlet cone 30 is connected to outlet 31, which preferably contains at least one sensor 35. Exhaust gas from the engine enters the SCR system through inlet 2 and clean exhaust gas, after passing through the SCR catalyst (not shown) within the outer shell 15, exits the SCR system through outlet 31. The locations of three transects (B-B, C-C and D-D) through the outer shell 15 are also shown.

The above description is intended to enable the person skilled in the art to practice the invention. It is not intended to detail all of the possible modifications and variations that will become apparent to the skilled worker upon reading the description. It is intended, however, that all such modifications and variations be included within the scope of the invention that is seen in the above description and otherwise defined by the following claims.

The invention claimed is:

1. A Selective Catalytic Reduction (SCR) system comprising a system inlet, a central tube, a gas flow system and a plurality of catalyst clusters; wherein:
  a. the system inlet comprises an inlet, and an initial mixing zone, the inlet being configured to receive exhaust gases from an engine and being in fluid communication with the mixing zone, the mixing zone comprising a plurality of means for introducing a reductant, or a reductant precursor, into exhaust gas in the mixing zone, the mixing zone located upstream from and being in fluid communication with the central tube, the mixing zone comprising at least one surface in thermal communication with the gas flow system, and wherein the mixing zone is formed by a cover, a wall, and an inlet cone and the wall is located between the cover and the inlet cone;
  b. the central tube being in fluid communication with the system inlet and the gas flow system;
  c. the gas flow system comprises (i) a gas flow deflector, (ii) a plurality of passages, and (iii) an outlet zone comprising an outlet cone and an outlet in fluid communication with the outlet cone, the gas flow deflector being in fluid communication with the central tube and either:
    i. a plurality of catalyst clusters, wherein the plurality of catalyst clusters is in fluid communication with a plurality of passages in fluid communication with the outlet zone; or,
    ii. a plurality of passages in fluid communication with a plurality of catalyst clusters, wherein the plurality of catalyst clusters are in fluid communication with the outlet zone; and
  d. each catalyst cluster comprises a SCR catalyst.

2. The system of claim 1, wherein the means for introducing a reductant, or a reductant precursor, into exhaust gas in the mixing zone is an injector or a nozzle.

3. The system of claim 1, wherein the system inlet further comprises at least one additional nozzle configured to control the shape of a droplet pattern formed by the at least one aerosol forming device.

4. The system of claim 1, wherein the SCR catalyst is in the form of a monolith or a particulate filter.

5. The system of claim 1, wherein the at least one SCR catalyst is in the form of a monolith or a particulate filter having a square, rectangular or circular shape in the net direction of gas flow through the monolith.

6. The system of claim 1, wherein the catalyst cluster further comprises an ammonia slip catalyst.

7. The system of claim 1, further comprising a particulate filter or an oxidation catalyst.

8. The system of claim 1, further comprising a means for controlling the introduction of urea or an ammonia precursor.

9. The system of claim 8, wherein the means for controlling the introduction of urea or an ammonia precursor comprises at least one of a NOx sensor, an $NH_3$ sensor and a temperature sensor.

10. The system of claim 1, wherein the deflector is configured to divide exhaust gas flow coming from the central tube into a plurality of subflows.

11. A method of reducing the amount of nitrogen oxides formed in the exhaust from an engine, the method comprising passing exhaust gas from the engine through an SCR system of claim 1.

12. The system of claim 1, wherein the means for introducing a reductant are located in the wall between the cover and the inlet cone.

13. A Selective Catalytic Reduction (SCR) system inlet comprising an inlet, an initial mixing zone, an outlet and a plurality of means for introducing an aqueous solution of a reductant or a reductant precursor, where inlet is in fluid communication with the initial mixing zone and the initial mixing zone located upstream from and is in fluid communication with the mixing tube leading to the SCR catalysts, the initial mixing zone is formed by a cover, a wall and an inlet cone, where the wall is located between the cover and the inlet cone, and the plurality of means for introducing an aqueous solution of a reductant or a reductant precursor are located on the wall.

* * * * *